Feb. 21, 1950
R. H. TAYLOR
2,498,054
ELECTRIC HEATING SYSTEM WITH MODULATING CONTROL
Filed Nov. 20, 1945
6 Sheets-Sheet 1
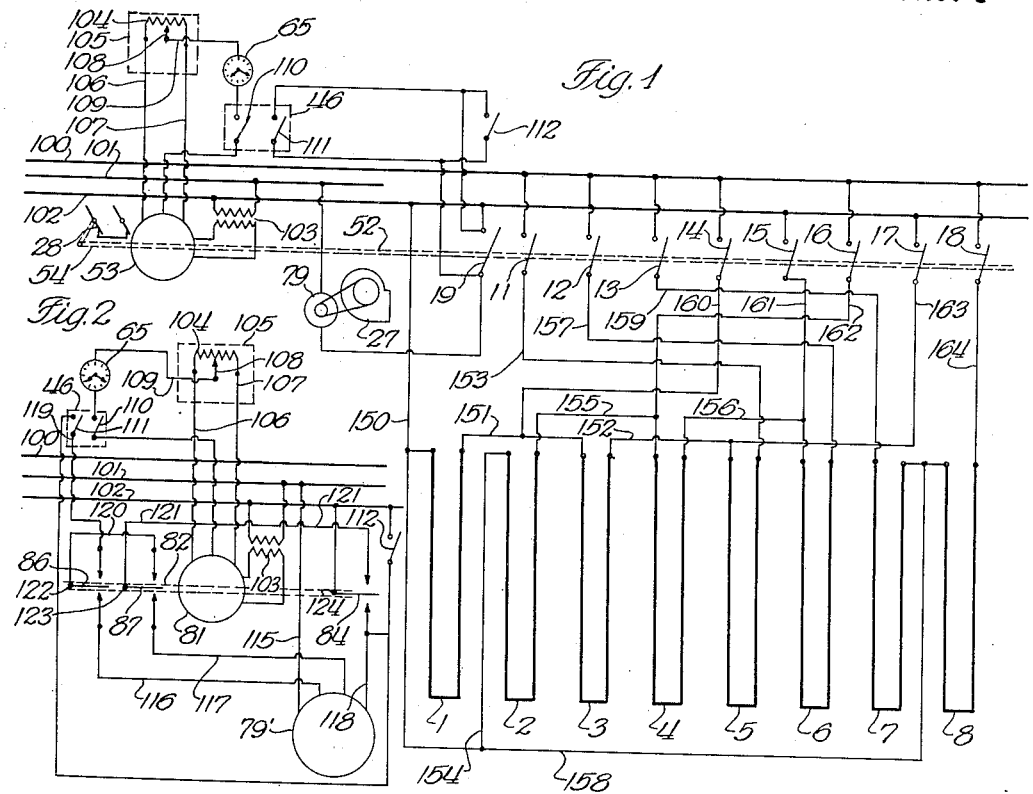
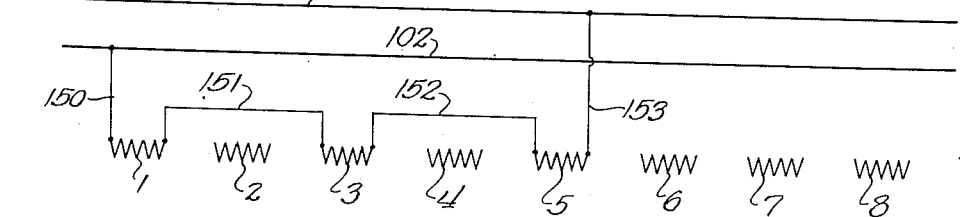
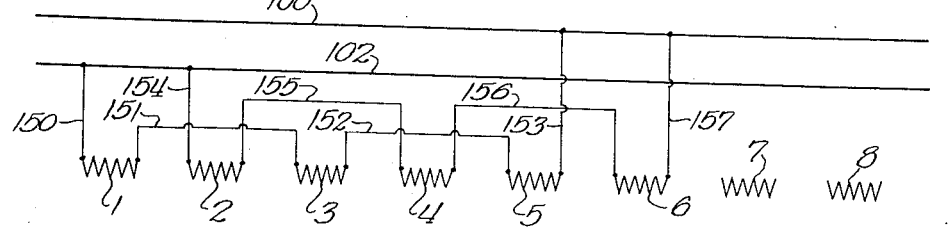
Riley H. Taylor
INVENTOR
BY
ATTORNEY Riley O. H. Taylor
INVENTOR

ATTORNEY

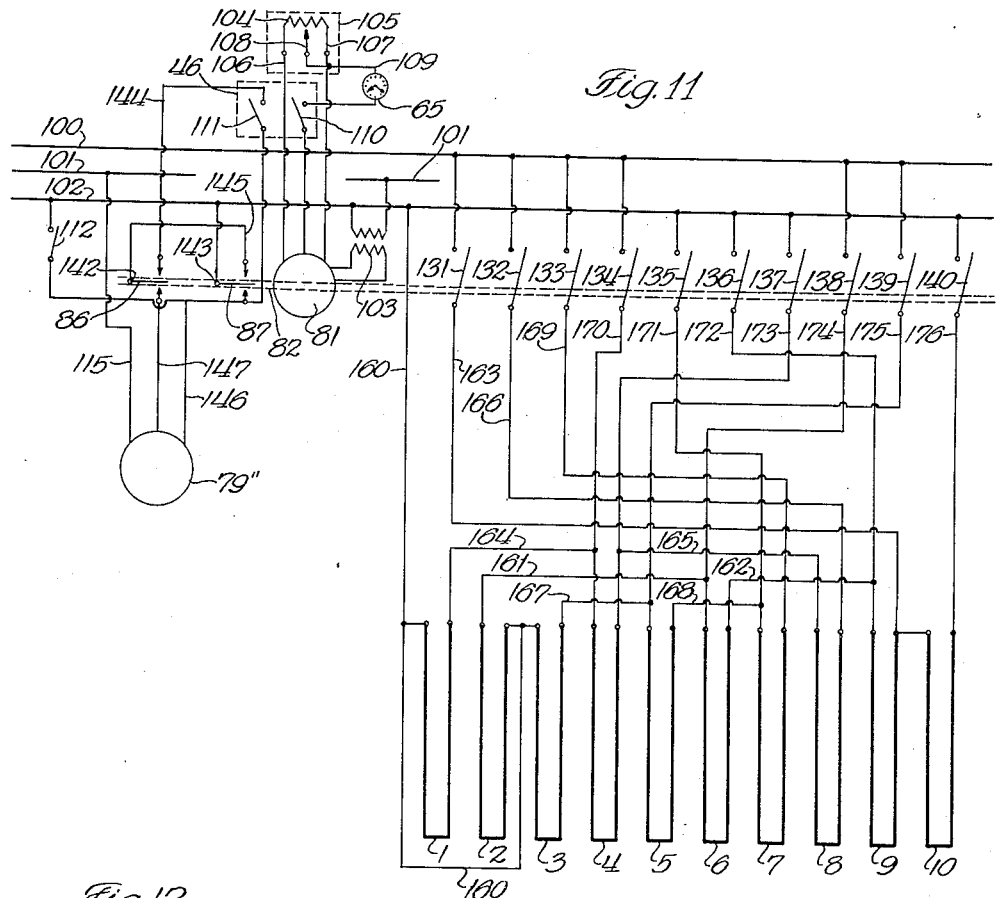
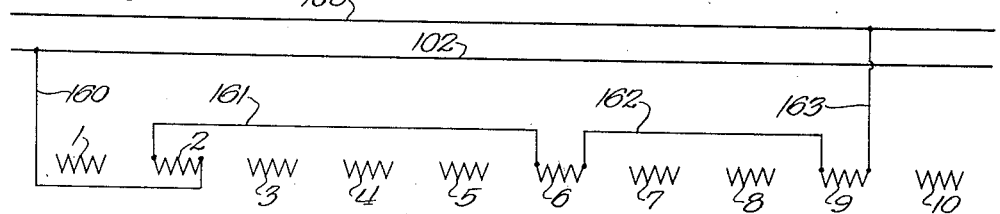
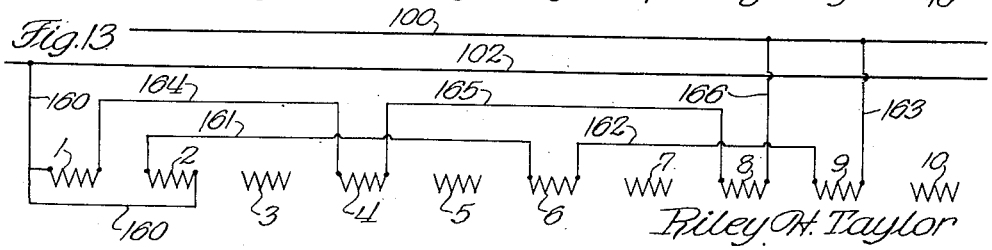

Feb. 21, 1950 R. H. TAYLOR 2,498,054
ELECTRIC HEATING SYSTEM WITH MODULATING CONTROL
Filed Nov. 20, 1945 6 Sheets-Sheet 4
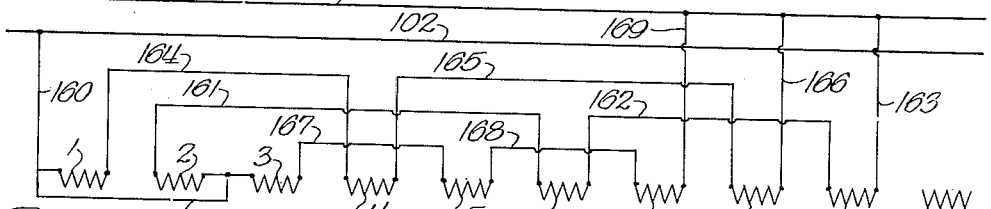
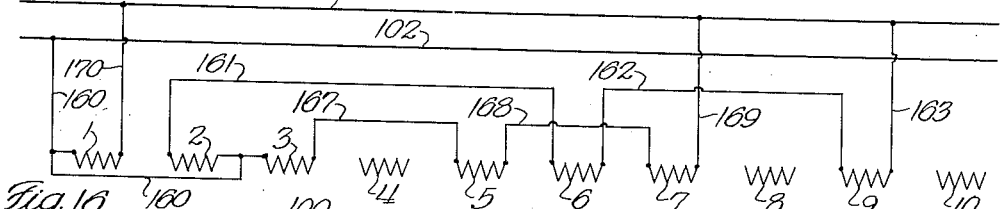
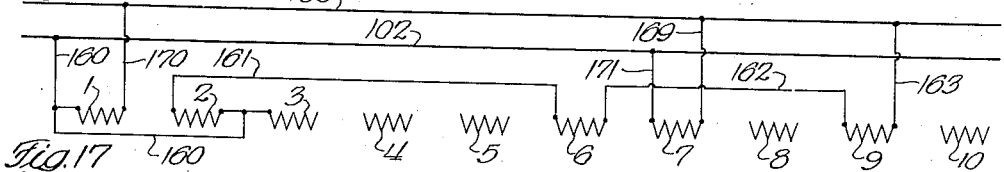
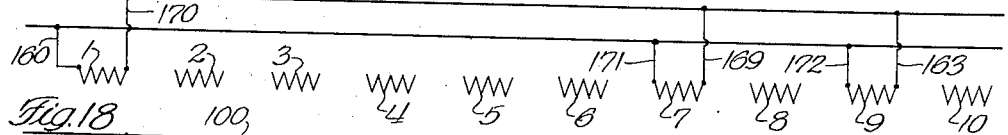
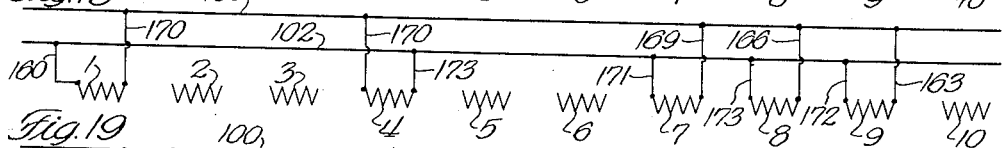
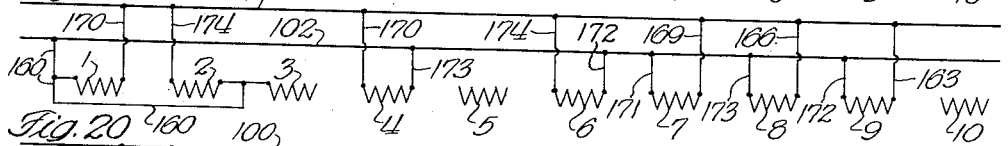
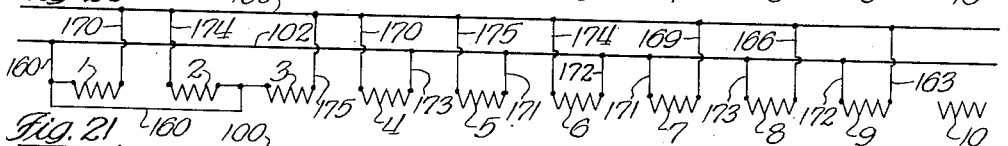
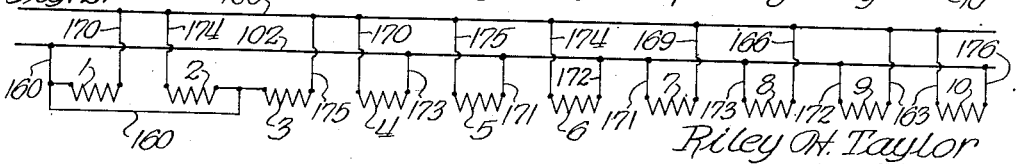
Riley H. Taylor
INVENTOR
BY Harold D. Cook
ATTORNEY Feb. 21, 1950   R. H. TAYLOR   2,498,054
ELECTRIC HEATING SYSTEM WITH MODULATING CONTROL
Filed Nov. 20, 1945   6 Sheets-Sheet 5

Riley H. Taylor
INVENTOR
By Harold D. Cook
ATTORNEY

Feb. 21, 1950

R. H. TAYLOR 2,498,054

ELECTRIC HEATING SYSTEM WITH MODULATING CONTROL

Filed Nov. 20, 1945

Riley H. Taylor
INVENTOR

By Harold D. Cook
ATTORNEY

Patented Feb. 21, 1950

2,498,054

UNITED STATES PATENT OFFICE 2,498,054

ELECTRIC HEATING SYSTEM WITH MODULATING CONTROL

Riley H. Taylor, Portland, Oreg.

Application November 20, 1945, Serial No. 629,853

11 Claims. (Cl. 219—39)

This invention relates to an electric heating system with modulating control for an electric furnace of the type used as a central heating plant for a dwelling house or other building.

The present heating system is particularly intended for use in an electric furnace of the type disclosed and claimed in my copending application, Serial No. 629,852, filed November 20, 1945, for Electric heating and ventilating unit, now Patent No. 2,449,755, issued September 21, 1948. The electric furnace therein disclosed comprises a single cabinet or housing adapted to fit under the bonnet of a conventional fuel burning furnace in converting from fuel to electric heating, or to be installed in new or revamped heating systems. A vertical partition divides the interior of the cabinet into two chambers, one being an air return chamber for receiving cool air from the room or space being heated, and the other being a plenum chamber comprising in part a heating chamber containing a bank of electric heating units. Filter and blower units are contained in the air return chamber for blowing cleaned air into the plenum chamber where it is heated and discharged into the bonnet to be conveyed back to the space to be heated. An adjustable baffle is provided in the plenum chamber to form a throat corresponding in width to the bank of heating units, so that all air forced through the plenum chamber must pass between the heating units in intimate heat transfer relation to become uniformly heated. The furnace is adaptable to different heat requirements by inserting the necessary number of heating units and adjusting the baffle at the time of installation to make the throat of the plenum chamber correspond thereto.

The heating units are disposed in closely spaced side by side relation in the throat to facilitate heat exchange therebetween in certain heating steps where some of the units are operated at a higher temperature than others, to tend uniformly to heat the cross section of the air mass passing therethrough. Modulating heat control is obtained according to the present invention through a step controller operating a gang of mercury switches to change the circuit connections to the heating units in a sequence of heating steps in response to the heat demand from a room thermostat in the space being heated. Means are also provided for varying the velocity of the air through the plenum chamber in accordance with the heat output to maintain a substantially even temperature of the heated air to avoid the delivery of relatively cold air into the house when the heat output is low and to avoid delivering unpleasantly hot air into the house when the heat output is high. In one form of the invention the velocity controlling means comprises dampers in the air return chamber operated by the step controller coordinately with the gang of heater switches. In another form of the invention the velocity controlling means comprises additional mercury switches actuated by the step controller to vary the speed of the fan in accordance with the modulation of the heat output.

One object of the present invention is to provide a system of circuits for modulating the thermal output of the bank of heating units in predetermined increments by means of the mercury switches associated with the step controller.

Another object is to provide a modulating heat control system wherein the heating effect is distributed over the whole bank of heating units in low and intermediate heating steps where certain units are energized at a higher temperature than are other units.

Another object is to provide a modulating control for a bank of heating units progressively to change circuit connections under the control of a thermostat to vary the heat output of the bank in small increments in accordance with changes in the heat demands.

Another object is to provide a modulating control requiring predetermined time intervals between steps in increasing or reducing the heat output regardless of the amount of the heat demand to prevent a sudden increase or decrease in load on the electrical system.

Another object is to provide a modulating heat control having coordinated switching means for varying the speed of a fan to deliver heated air at a substantially constant temperature regardless of variations in the heat output of the system.

Another object is to provide a safety control operable to deenergize all the heating units in the event of excessive bonnet temperature in the furnace.

Another object is to provide a safety control for starting the fan if an excessive temperature should develop in the bonnet when all the heating switches are in off position.

Another object is to provide a switching arrangement for establishing successive series and parallel connections of the heating units in predetermined increments of increasing heat output by closing additional switches.

Another object is to provide a switching arrangement for producing a modulating control by energizing successive groups of heating units in series and subsequently individual units in parallel, wherein the heating effect is distributed across the bank of heating units in each control step.

Still another object is to provide a manually controlled circuit in addition to the automatically controlled circuits for establishing fan operation for cooling and ventilating on occasions when heating is not desired.

A further object is to provide a system of circuits for modulating control of a bank of heating units such that the number of units may be varied without requiring extensive changes in the control unit or wiring arrangements to maintain distributed heating effects in all heating steps.

With these and other objects in view, the invention resides in the combination of elements and circuit arrangements described in the specification and shown in the accompanying drawings illustrating certain preferred embodiments of the invention. A number of different wiring arrangements for different numbers of heating units are disclosed as illustrative of the invention, and additional arrangements of the same nature will occur to those skilled in the art. All such changes and modifications are included in the invention, the same being limited only by the scope of the appended claims.

In the drawings:

Figure 1 is a wiring diagram of a system for modulating heating control in an electric furnace of the type disclosed in Figure 1 in my above mentioned copending application employing a single speed fan and modulating dampers;

Figure 2 is a fragmentary wiring diagram of a system using the step controller arrangement shown in Figure 7 of my copending application for controlling a three speed fan;

Figures 3 to 10 illustrate diagrammatically the active heating circuits established in successive steps by the closing of the heater switches in the step controller in Figures 1 and 2;

Figure 11 illustrates a system embodying the principles of the present invention, in which there are ten heating units and a two speed fan;

Figures 12 to 21 illustrate diagrammatically the active heating circuits established in successive steps by the system of Figure 11;

Figure 5:
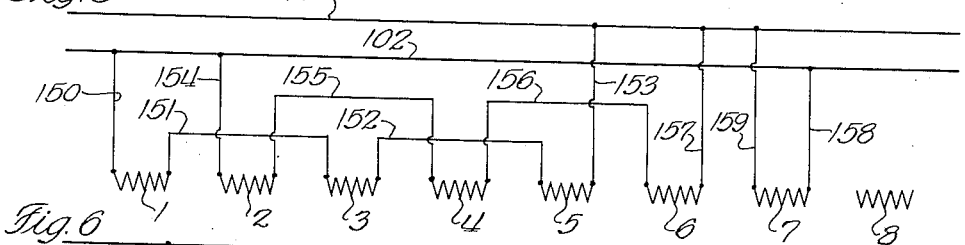

The sheathed heating units 1 to 8, illustrated in physical form in my copending application, are identified by the same reference numerals in the present drawings, and are represented in Figure 1 as U-shaped hairpin resistors arranged in side by side relation in the same relative positions they occupy in the furnace. Likewise, similar reference numerals are applied to the gang of mercury switches 11 to 19, the fan motor 79, the step controller motor 53, the bonnet switch 46, and the clock switch 65.

The system is energized from a three wire supply comprising the wires or bus bars 100, 101 and 102 providing 220 volts between the outside wires and 110 volts between an outside wire and the neutral 101. The step controller motor 53 is energized at low voltage as, for example, 24 volts, by means of a transformer 103 connected to one of the 110 volt circuits as shown, and operates through reduction gearing to drive a cam shaft, indicated diagrammatically at 52, having individually adjustable cams for tilting each of the mercury switches 11 to 19 in the manner shown in my copending application. The motor rotates at a constant speed and the gear reduction is such as to cause the mercury switches to make successive circuits at intervals of several seconds to prevent the closing of more than one switch at a time so that the load called for by the heat demand will be brought on and taken off the line gradually. The motor is reversible and has incorporated therein two legs of a Wheatstone bridge control, the other two legs of which comprise the potentiometer resistance 104 in a room thermostat 105. The ends of the potentiometer resistance 104 are directly connected to the bridge components in the motor through wires 106 and 107, and a thermal responsive potentiometer slider 108 is connected by a wire 109 through the clock switch 65 and a thermal responsive bonnet switch 110. The Wheatstone bridge legs incorporated in the motor 53 comprise a potentiometer resistance similar to the potentiometer 104 and provided with a slider movable with the cam shaft so that when the slider 108 is moved the motor will rotate the proper amount in the proper direction to rebalance the bridge circuit in a manner well understood in the art.

In such an arrangement the motor operates only until the bridge circuit is rebalanced. As long as the room temperature stays constant the motor remains stationary. For normal operation in applying modulating control, the clock switch 65 and the bonnet switch 110 must be closed to complete a circuit to the motor through the wire 109, the bridge connections in the motor being such that when the circuit 109 is broken the motor will automatically return the cam shaft to an "off" end position, opening all of the switches 11 to 19. Thus the clock switch 65 is effective to shut down the heating system at a preselected time and the bonnet switch 110 may be set to shut down the system upon the occurrence of an excessive bonnet temperature, as might happen, for example, in case of fan failure.

In the course of normal operation the step controller, comprising the motor 53 and the mercury switches 11 to 19, responds to the heat demand indicated by the thermostat 105 by rotating back and forth from time to time to exert a modulating control over the thermal output of the bank of heating units by opening and closing successive switches to change the heat output in predetermined increments. This action is initiated by movement of the thermal responsive slider 108 across the potentiometer resistance 104. The resistance 104 comprises fine wire wound in closely spaced turns so that slight movements of the slider 108 will produce corresponding small changes in position of the cam shaft which trips the heater switches. Large movements of the slider 108 produce correspondingly large movements in the cam shaft, the latter responding in sense as well as in magnitude to the movements of the slider 108. Thus a large drop in room temperature will produce a large movement of the cam shaft to close a number of the heater switches to produce a greatly increased heating effect, while a small drop in temperature will produce a correspondingly small movement of the cam shaft to effect a small increase in the heat output. When the room temperature exceeds the desired value the cam shaft will rotate in the opposite direction to open one or more of the closed switches to reduce the heat output.

The fan motor 79 is normally energized by the first mercury switch 19, which is set to come on just before the first heater switch 11 in the initial stages of rotation of the cam shaft from its "off" end position. The switch 19, however, is shunted by a thermal responsive bonnet switch 111 which is normally open but which closes upon an excessive bonnet temperature to remove heat from the heating chamber in case of a short circuit or other electrical failure which would energize one or more of the heating units when all the mercury switches were turned to off position. Fan operation in this manner also serves as an indication of trouble by blowing hot air into the house when it is not called for. The bonnet switch 111 is preferably adjusted to close at the same temperature at which the switch 110 opens, these switches preferably being actuated in unison in the manner illustrated in my copending application.

Fan operation through the bonnet switch circuit also occurs under certain conditions of normal operation when there is no fault. In warming up the house in the morning, for example, the highest heating step is usually called for by the room thermostat to produce maximum heat output for a time. Then by the time the house is warm inside the sun may be heating the outside, so that once the step controller starts to reduce the heat output it may continue to move directly to its "off" end position and remain there for the rest of the day, thereby stopping the fan. The high heat content of the heating units and heating chamber would then immediately raise the temperature sufficiently to cause the bonnet switch to re-start the fan to remove heat from the heating chamber.

An additional manual switch 112 may be provided to operate the fan for ventilating and cooling in warm weather when the heating system is not in operation. Inasmuch as the dampers in the air return chamber would be partially closed when the heating system is not operating, a removable panel is provided in the furnace cabinet for drawing cool air from the basement or furnace room in warm weather. In such event there would be no air return, the air being exhausted through open windows or doors in the house. The fan motor 79 is a single speed motor, no modulation of the air flow being necessary for ventilation without heating.

When the heating system is in operation the fan still runs at a constant speed, velocity modulation of the air flow being obtained by the dampers 28 actuated by the end 54 of the previously mentioned cam shaft 52. The damper operating linkage is arranged to increase progressively the damper opening from a minimum in the lowest heating step to a maximum in the highest heating step. In the "off" end position of the cam shaft the dampers are partially re-opened to supply air for fan operation by the bonnet switch in the manner described.

Figure 2 illustrates three speed fan circuits for obtaining velocity modulation by control of the fan speed without the use of dampers. A modified arrangement of the step controller having additional cam operated switches to effect this mode of operation is disclosed in Figure 7 of my copending application wherein ten heater switches 84 are shown on one side of the step controller motor 81, and two fan switches 86 and 87 are shown on the other side of the motor controlled by cam shaft 82 in place of the damper control mechanism. The first switch 84 is connected in one of the fan circuits, the next eight switches control heating circuits, and in the present system the last switch would be idle.

This arrangement provides an extra switch in case additional heating units necessitating more heating steps should be found necessary adequately to heat the building. A system of circuits will hereinafter be disclosed for controlling ten heating units with nine step control switches which would require only simple changes in the wiring connections to change over from a system employing eight heating units controlled by eight step control switches, providing the extra switch was included in the step controller unit. An important feature of the present heating system is the facility with which the number of heating units and the number of control steps may be varied in this manner by merely changing a few wiring connections. In installing electric furnaces in houses of different types and sizes, it is often difficult to estimate exactly the heat requirements to meet the satisfaction of the occupants. After installing an electric furnace, it may be found necessary to add additional heating units to provide a satisfactory heat output, while at the same time it is not ordinarily desirable to install extra units in the first place as the cost of operation might be increased by the additional maximum demand in kilowatts.

The potentiometer thermostat 105, bonnet switch 46 and clock switch 65 in Figure 2 correspond to the similarly designated units in Figure 1 and operate in the same manner. The fan motor 79' in Figure 2, however, is a three speed fan connected with a neutral wire 115, a low speed circuit 116, a medium speed circuit 117, and a high speed circuit 118. The speed of the fan is controlled by the switches 86, 87 and 84, respectively, which are single pole, double throw switches, the switch 84 being the first of the series of switches 84 shown in the above mentioned Figure 7 in the copending application. For the different speeds of fan operation, circuits are established in certain positions of the step controller through wires 119, 120 and 121, represented on the wiring diagram as connected with back contacts of the three switches.

When the step controller 81 is in its no-heat or "off" end position, all the diagrammatic switch arms in the switches 86, 87 and 84 may be considered as making contact with the top or back contacts. This position of the three switches opens all the fan circuits but establishes a connection from the terminal 122 in switch 86 through the wire 120 and switch 87 to its terminal 123, thence through the wire 121 and switch 84 to its terminal 124 which is connected with the line 102. The cams on the step controller are adjusted so that when the furnace is first turned on and the motor 81 starts to rotate in response to a heat demand, the switch 86 will tilt first to close a circuit through the above mentioned elements and the low speed wire 116 about two seconds before the first heating switch is closed. The fan operates at low speed for the first two heating steps and then between the second and third steps the switch 87 tilts to establish a circuit between the terminal 123 and the medium speed wire 117, which action also opens the circuit through the wire 120 to the low speed wire 116. The fan then operates at medium speed through the sixth heating step, the switch 84 making connection between its terminal 124 and the high speed wire 118 between the sixth and seventh steps. This action of the switch 84 opens the circuit through wire 121 so that both wires 116 and 117 are then deenergized and wire 118 alone is energized for continued high speed operation of the fan through the higher heating steps.

The high speed fan circuit 118 also includes a manual switch 112 in a branch circuit for summer operation of the fan when the heating system is closed down, and bonnet switch 111 for starting the fan in the event of excessive temperature in the heating chamber. The circuit through the bonnet switch is completed through the wire 119 and the so-called top or back contacts of each of the switches 86, 87 and 84 to the terminal 124 which is connected with the line wire 102, these switches all being in their back positions when the furnace is not in operation.

Figures 3 to 10 show the manner in which the eight heating units are brought into different active circuits by the sequential closing of the eight heater switches 11 to 18 by the step controller in eight successive heating steps from minimum to maximum heat output. These diagrams show how the heating effect is distributed across the bank of heating units in each step so that inactive units receive heat from energized units on either side thereof to tend uniformly to heat the stream of air passing through the bank. Thus, when the first heater switch 11 is closed a heating circuit is established through wires 150, 151, 152 and 153 to energize the units 1, 3 and 5 in series, as shown in Figure 3. The units 2 and 4 would also be heated to a fairly high temperature by heat transfer from closely adjacent energized units, and the unit 6 would similarly receive heat on one side from the unit 5 and would in turn transfer some of this heat to the next adjacent unit 7. Except in very mild weather the step controller would ordinarily pass over this heating step after a few seconds and would run to the last step to warm up the house, after which it would exert a modulating control in certain of the intermediate heating steps. In fact, from the standpoint of operating time, the first heating step would ordinarily be the least used, and so it is not objectionable in this step to have three de-energized units together at the same end of the bank.

As successive switches close, those previously closed remain closed, and so with the closing of switch 12 an additional series circuit through the wires 154, 155, 156 and 157 comprising the three heating units 2, 4 and 6 is energized along with the units, 1, 3 and 5, as shown in Figure 4. Thus in step 2 the first six units are all energized at the same temperature, and after they have been switched on a short time the end units 7 and 8 receive a considerable amount of heat therefrom to substantially uniformly heat the air stream.

In the third heating step, effected by the closing of switch 13 along with the already closed switches 11 and 12, the unit 7 is connected through wires 158 and 159 directly across the line in addition to the two series circuits established in steps 1 and 2. The unit 7 thereby receives three times the energy input of each of the other energized units, but a large part of this additional energy is dissipated into the inactive unit 8 and the adjacent end of the heating chamber so that the unit 7 does not immediately attain a substantially higher temperature than the other units.

Figure 6:
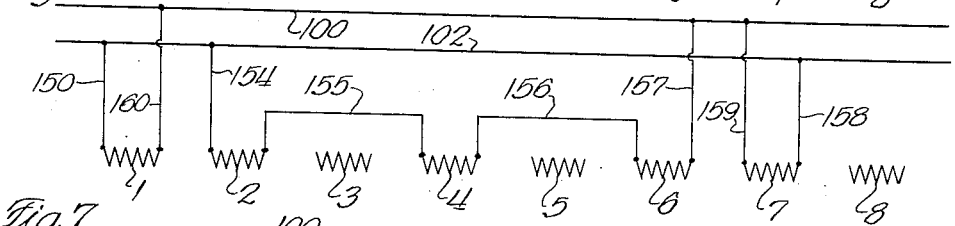

The closing of switch 14 produces the active heating circuits shown in Figure 6, illustrating the fourth heating step. In this step the first series circuit is changed by a shunting connection 160 to place unit 1 directly across the line, thereby rendering the wires 152 and 153 and the units 3 and 5 inactive. The single unit 7 and the second series circuit comprising the units 2, 4 and 6 remain on the line. This arrangement produces a symmetrical heating effect except for the inactive unit 8 on the end which is heated indirectly by the unit 7. The de-energized units 3 and 5 are heated indirectly by their interposed and surrounding units 2, 4 and 6.

Figure 7:
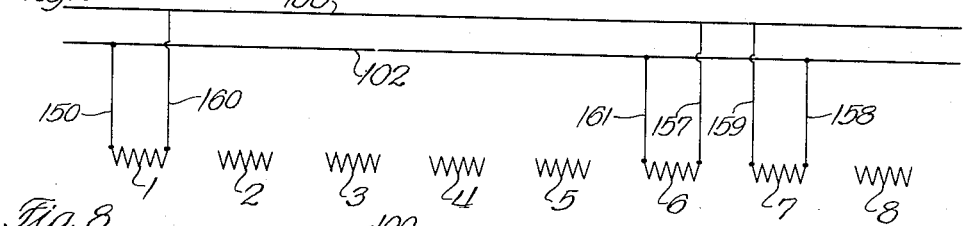

In the fifth step, shown in Figure 7 and effected by the closing of the switch 15, the remaining series circuit is interrupted by the shunting wire 161 and the three units 1, 6 and 7 are then connected directly on the line. Although the heat distribution is not uniform in this particular step, it is in the intermediate hunting range of the modulating control as it moves back and forth from one heating step to another, so that ordinarily no one step is in effect for a continuous period of very long duration. The heating steps both preceding and subsequent to this step energize certain of the inactive units 2 to 5 so that these units are energized from time to time by the hunting of the step controller and at other times receive heat from the next adjacent hot units 1 and 6.

Figure 8:
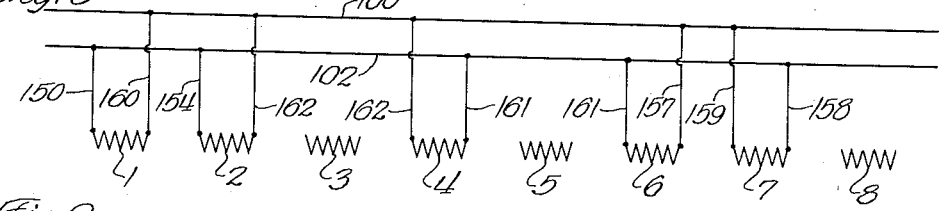
Figure 9:
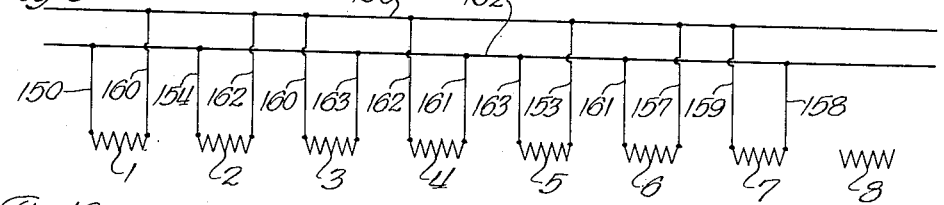
Figure 10:
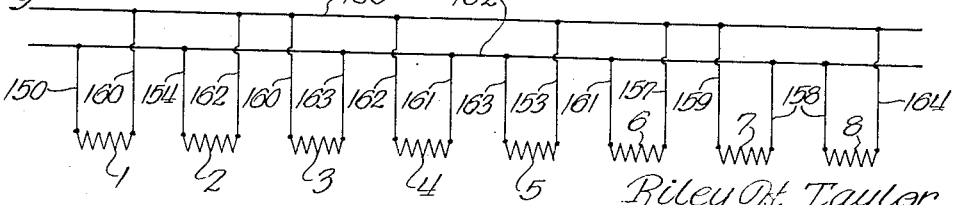

The last three heating steps, effected by the successive closing of the switches 16, 17 and 18, connected with wires 162, 163 and 164, add additional units as shown in Figures 8, 9 and 10 until, in the end position of the step controller, all eight units are connected directly on the line for the maximum heat output of the furnace. In these figures, wires common to several circuits are redrawn for each circuit and inactive connections are omitted to simplify the wiring diagrams.

The successive energization of different numbers of heating units in the circuit arrangements just described is accomplished by the making of new circuits and shunt circuits as the step controller moves from its low heat end position to its high heat end position without breaking any circuits previously made. The first shunting connections are thereby utilized again in additional parallel circuits for the individual elements energized in the later heating steps to reduce the number of wiring connections to the bus bars 100, 102. Upon a demand from the thermostat for less heat output, the step controller cam shaft revolves in the opposite direction to open the switches successively, beginning with switch 18 and ending with the switches 11 and 19. When the furnace is first switched on in a cold house there is ordinarily a demand for the maximum heat output to warm up, causing the step controller to go through the cycle just described finally to close all the switches and establish the maximum heat output for a time. As the heat output increases, the dampers in the air return chamber are opened by the step controller in the manner previously described, in the case of Figure 1, to maintain a substantially constant air temperature in the output of the heating chamber. The same effect is accomplished by the multi-speed fan shown in Figure 2, except that, instead of gradual damper control, the air flow is subjected to the control effected by three speed operation of the fan. Sufficient thermal output is provided in the heating system to warm up the space to be heated in a reasonable length of time and allow the step controller to return to a position to exert modulating control over an intermediate range of heating steps as called for by the room thermostat.

The above described circuit connections for the various heating steps are selected to produce distributed heating effects and with a view to providing suitable increments in the heat output from step to step. In the present embodiments, conventional heating units are used having an individual energy consumption of 2000 watts on 220 volts. The heating effects produced by the eight heating steps in the systems of Figures 1 and 2, expressed in watts, are tabulated as follows:

Step 1 (Figure 3), 666⅔ watts
Step 2 (Figure 4), 1333⅓ watts
Step 3 (Figure 5), 3333⅓ watts
Step 4 (Figure 6), 4666⅔ watts
Step 5 (Figure 7), 6000 watts
Step 6 (Figure 8), 10,000 watts
Step 7 (Figure 9), 14,000 watts
Step 8 (Figure 10), 16,000 watts Figure 11 illustrates the principles of the invention embodied in a wiring system for use with ten heating units controlled by a step controller in ten heating steps. The system corresponds in general to that shown in Figure 2, and like reference numerals are applied to similar elements. In this case a two speed fan 79'' is used, controlled by the two switches 86 and 87, all the ten switches on the right side of the step controller being used to produce the ten heating steps. The step controller is preferably of the type shown in Figure 7 of my copending application, the switches 84 therein being herein individually designated by the numerals 131 to 140 to avoid confusion in the description of the circuits.

When the furnace is out of operation, the switches 86 and 87 are in the diagrammatic back or top position with the central terminal 142 connected with wire 144 and central terminal 143 connected with a wire 145. This position of the switches completes a safety circuit through the high speed fan connection 146 to the bonnet switch 111, which is adapted to close upon excessive bonnet temperature when the furnace is supposed to be out of operation. As in the previous embodiments, the manual switch 112 is available for fan operation for summer cooling and ventilating. Upon a demand for heat when the furnace is switched on, initial rotation of the step controller will first close the switch 86 on its lower contact to complete a low speed circuit 147 to the fan about two seconds before the closing of switch 131 to effect the first heating step. The low speed circuit for the fan may be traced through the neutral wire 115, wire 147, terminal 142, wire 145, terminal 143, to the line wire 102. The actuating cams for switch 87 are set to shift this switch to its diagrammatic lower position between the fourth and fifth heating steps to produce high speed operation of the fan through a circuit including the wires 115 and 146. By providing an additional switch in the step controller, a three speed fan may be employed to produce more uniform heating of the air over the whole range, in the manner shown in Figure 2. Alternatively, a single speed fan may be used and the air velocity modulated by a gradual damper control as used in the system of Figure 1. Also a combination of damper and fan speed control may be employed if desired, by using a multispeed fan circuit as shown in Figures 2 or 11 and also arranging a damper and damper control operated by the cam shaft as shown in Figure 1.

The wiring system shown in Figure 11 produces ten successive heating steps wherein the active heating units are connected in various series and parallel circuits as illustrated in Figures 12 to 21. Thus, as shown in Figure 12, the units 2, 6 and 9 are connected in series by the wires 160, 161, 162 and 163 in the first step, the energized units being spaced so that each one is flanked by two inactive units which receive heat therefrom and thereby assist in heating all the air passing through the bank of units.

In the second step the closing of the switch 132 brings in a second group of three units connected in series by the wires 160, 164, 165 and 166 as shown in Figure 13, and the third step brings in a third group of three units connected in series by the wires 160, 167, 168 and 169, to produce uniform heating throughout the first nine units, as shown in Figure 14, with the tenth unit heated by radiation and conduction therefrom.

Steps four and five, shown in Figures 15 and 16, connect shunting wires 170 and 171 by the closing of switches 134 and 135, eliminate two of the series circuits and substitute individual elements, so that in step five only the first series circuit remains comprising units 2, 6 and 9, supplemented by the individual elements 1 and 7.

Step six effects the closing of switch 136 connected with shunting wire 172 to complete the elimination of all three series circuits, substituting therefor the three individual units 1, 7 and 9 as shown in Figure 17.

The next three steps add individual units two at a time, and the last step adds the remaining unit 10, the active units being distributed in each heating step until all are energized. In step seven the closing of switch 137 energizes wire 173 to both units 4 and 8 as shown in Figure 18, and in step eight the closing of switch 138 energizes wire 174 to both units 2 and 6 as shown in Figure 19. In step nine the closing of switch 139 energizes the wire 175 to both units 3 and 5 as shown in Figure 20, and in step ten the closing of switch 140 energizes the wire 176 to the end unit 10 as shown in Figure 21.

It will be seen that where there are units energized individually and in series in the same step, the series circuits producing less heat are for the most part confined to the central portion of the bank and the individually energized units producing more heat are disposed predominantly at the ends of the bank. Similarly, in those steps where there are relatively few units energized individually and none in series groups, the inactive units are disposed centrally in the bank and the active units are disposed at or near the ends of the bank. In this way, as the modulating control steps back and forth from one switching position to another, the end units on the average receive more energy input than the central units which are shielded from the side walls of the heating chamber. Thus, while the heating effect may appear to be unbalanced in step six, as shown in Figure 17, by the inactivity of units 2 to 6, it will be noted that in step five units 2 and 6 of this group are energized in a series circuit and that in step seven unit 4 in the center of this group is energized individually, so that as the control modulates both ways from step six heat will periodically be supplied to three of the units which are indicated as inactive in Figure 17. In this way the modulating action of the step controller continually shifts its predominant heating effect from one group of heating units to another to maintain a fairly equitable average distribution of heat across the bank. This not only makes for uniformly heated air, but tends to produce a more uniform loading of the various heating units in terms of kilowatt hours over a period of time so as to avoid premature failure of certain units while other units are little used.

Figure 22:
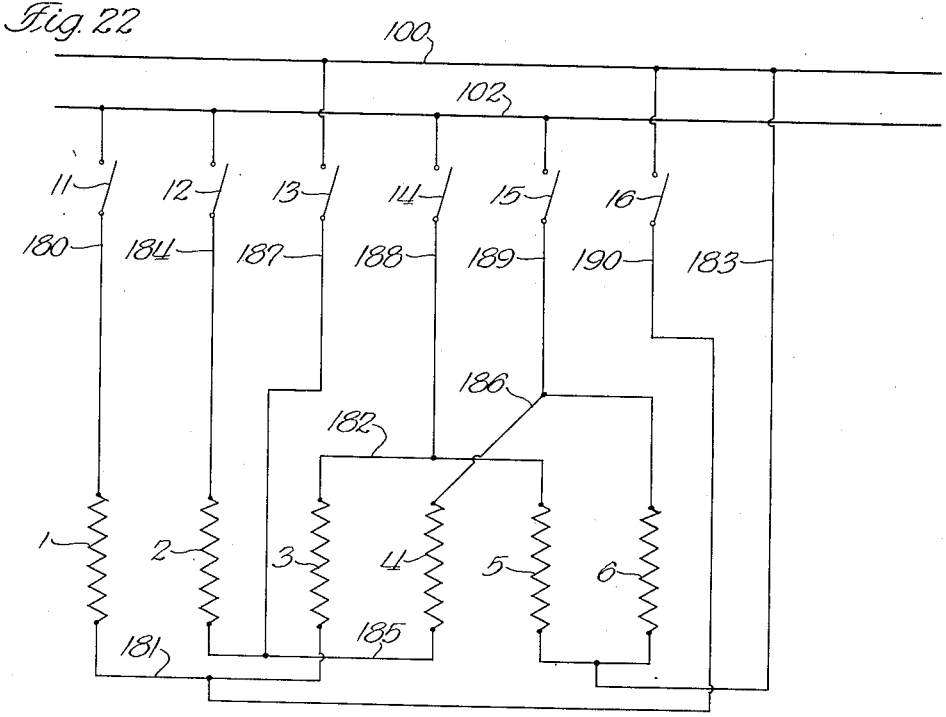
Figure 22 illustrates a heating system having six heating units and a six step control.

Assuming each of the heating units in Figures 11 to 21 to be a 2000 watt unit on 220 volts, the following tabulation shows the heat output in terms of watts in each heating step and identifies these steps in the wiring diagrams in the drawings:

Step 1 (Figure 12), 666⅔ watts
Step 2 (Figure 13), 1333⅓ watts
Step 3 (Figure 14), 2000 watts
Step 4 (Figure 15), 3333⅓ watts
Step 5 (Figure 16), 4666⅔ watts
Step 6 (Figure 17), 6000 watts
Step 7 (Figure 18), 10,000 watts
Step 8 (Figure 19), 14,000 watts
Step 9 (Figure 20), 18,000 watts
Step 10 (Figure 21), 20,000 watts Figures 22 to 25 illustrate the manner of applying the principles of the invention to various numbers of heating units to attain the objects and advantages hereinabove pointed out in connection with previously described embodiments. In Figure 22 there are six two-thousand watt units controlled in six steps by switches 11 to 16 to produce heating effects in increments from 666⅔ watts to 12,000 watts. The circuit connections in the first two steps are similar to those in the previous embodiments in that the first step energizes a group of three distributed units in series and the second step adds a second group of three distributed units in series. In the first step the closing of switch 11 completes a series circuit through units 1, 3 and 5 including the wires 180, 181, 182 and 183, and in the second step the closing of switch 12 completes an additional series circuit through units 2, 4 and 6 including the wires 184, 185, 186 and 183.

All the units being accounted for in active circuits in the second step, the third step leaves one of the series circuits active, comprising units 1, 3 and 5, and by closing switch 13 to wire 187 substitutes the individual unit 2 for the other series circuit to effect an increase in the wattage with fairly well distributed heating. In the fourth step, by closing of switch 14 to wire 188 a second individual unit 5 is substituted for the remaining series circuit, so that there are only two active units in this step, but the heating effect is considerably greater than in step three. Two additional individual units 4 and 6, and 1 and 3 are added in each of the last two steps by the energizing of wires 189 and 190 to complete the energization of the six units individually for maximum heat output.

Figure 23:
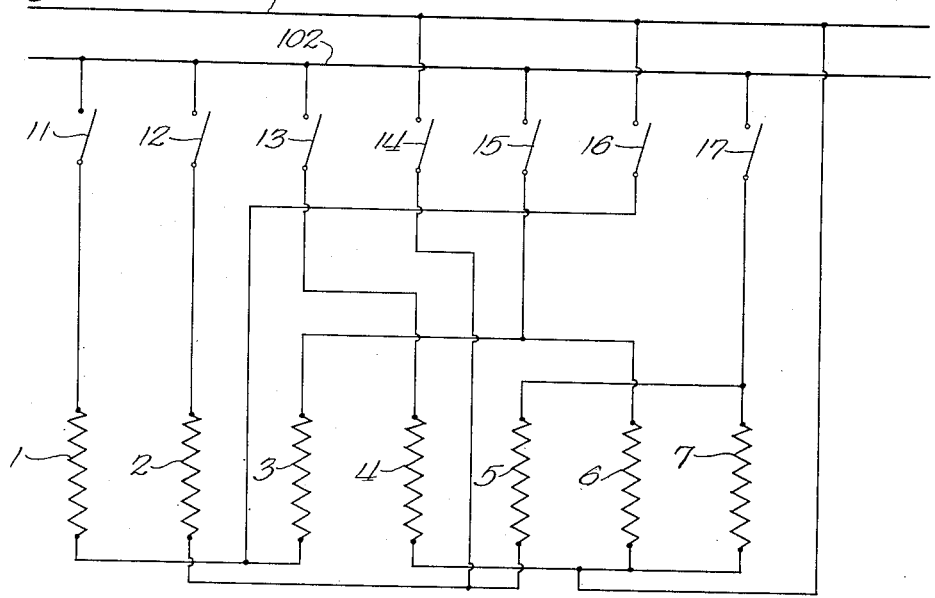
Figure 23 illustrates a heating system having seven heating units and a seven step control.

In Figure 23 seven units are energized in seven steps. The first two steps correspond to those in the preceding embodiment, but there is then an inactive seventh unit which is added individually in the third step. In the remaining steps individual units are substituted for series circuits and remaining inactive units are energized individually until all seven units are energized to produce a total of 14,000 watts.

Figure 24:
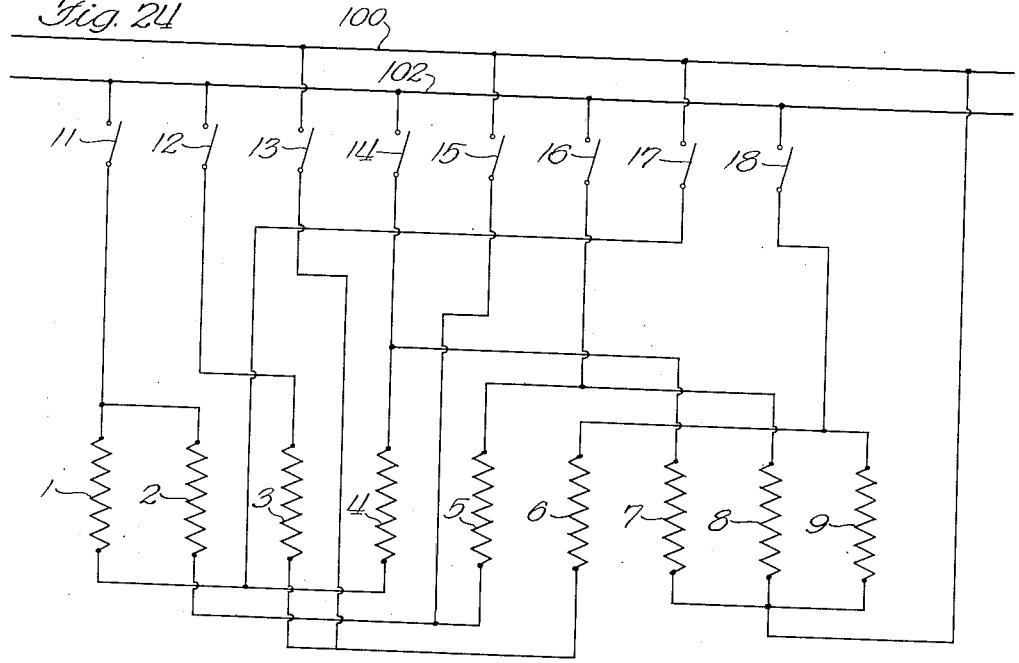
Figure 24 illustrates a heating system having nine heating units and an eight step control.

In Figure 24 nine units are energized in eight steps to produce a maximum output of 18,000 watts. Here it will be seen that the first step in the preceding embodiment in that 1333⅓ watts are obtained from two distributed groups of three units in series. The second step then brings in a third group of three to produce 2000 watts whereby the maximum output of one individual unit is distributed uniformly over the bank of nine units. The succeeding steps follow as in the preceding embodiment, individual units being substituted for series groups and additional individual units added until all are energized.

Figure 25:
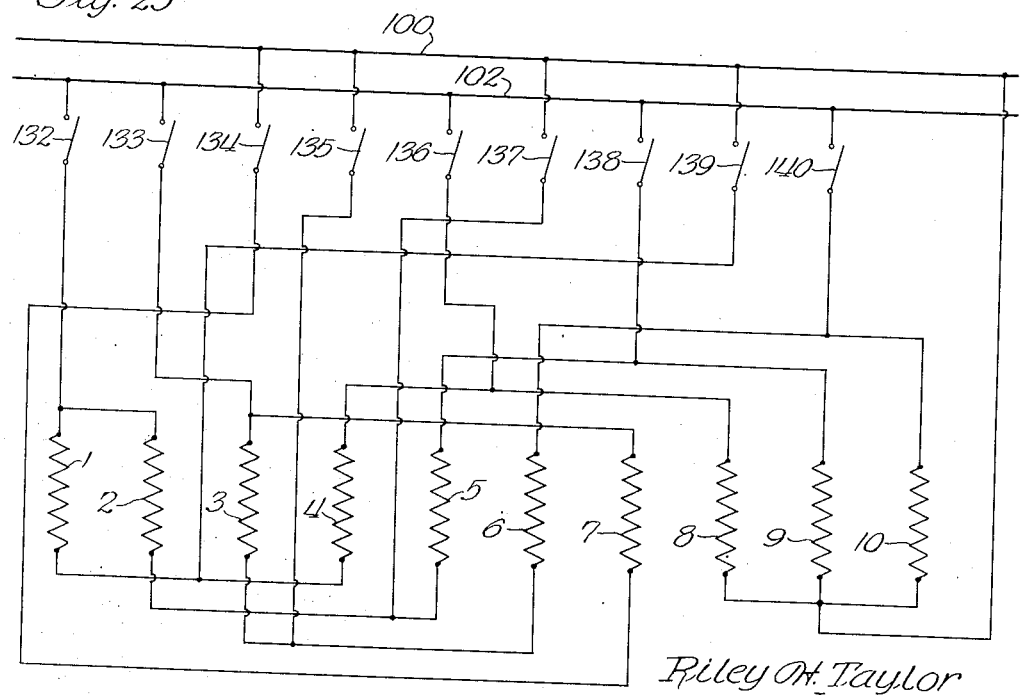
Figure 25 illustrates a heating system having ten heating units and a nine step control.

Figure 25 discloses an arrangement for energizing a ten unit bank in nine steps preferably by the step controller shown in the previously mentioned Figure 7 in my copending application, and employing either a two or three speed fan as shown in preceding embodiments. Only nine switches are required for the heating circuits, leaving the auxiliary switches 86 and 87 and the first switch 131 available for the fan circuits. In Figure 25 the first two steps, produced by the closing of switches 132 and 133, correspond to the first two steps in Figure 24 in the use of two and then three series groups of distributed units. Step three completes the energization of all the inactive units by the closing of switch 134 which connects the single remaining unit individually across the line to produce an increase of 2000 watts. Thereafter, in successive steps individual units are substituted for series groups and resulting inactive units are added until all ten units are energized individually by the switches 132 to 140 to produce 20,000 watts.

In Figures 22 to 25 the resistor elements in the heating units are drawn in conventional form to simplify the wiring diagrams, but it is understood that resistors 1 to 10 represent heating units 1 to 10 of the type described hereinabove and in my copending application. In the physical construction the resistor elements are preferably of hairpin shape to make both terminals accessible at the same end of the unit for convenience in making the wiring connections at one end of the bank in an enclosed terminal housing shielded from the heat developed in the heating chamber. The physical form of the heating units is immaterial to the present invention, however, and reference to the preferred construction illustrated in my copending application is not intended as a limitation to the present disclosure or claims.

The invention also is not limited to 2000 watt units, as either larger or smaller capacity units may be used. This size unit is commercially obtainable and has become standardized by certain manufacturers, so that the foregoing tables of heat outputs in different heating steps may be used for comparison with other electric heating appliances, or may be converted into B. t. u. for comparison with fuel burning heaters and furnaces.

Main switches, fuses, and other circuit elements not affecting the operation of the step controller or the heating and fan circuits are omitted from the present wiring diagrams to clarify the invention, as the use of such elements is generally understood by persons skilled in the art and is not necessary to an understanding of the invention.

Having now described my invention and in what manner the same may be used, what I claim as new and desire to protect by Letters Patent is:

1. A heating system comprising a bank of heating units, a modulating step controller comprising a gang of individual switches arranged for automatic operation in timed sequence, circuit connections between said switches and said heating units for producing different heat outputs in different step positions of said controller, means for producing an air flow over said units, and means operated by said controller for varying said air flow in accordance with said heat output.

2. An electric heating system comprising a bank of heating units, a step controller having a gang of switches connected with said heating units to exert an automatic modulating control over the heat output of said bank in response to heat demands wherein different combinations of heating units distributed across said bank are energized in different control steps, means for moving an air flow over said bank of units in heat transfer relation therewith, and means operable by said step controller to modulate said air flow in accordance with the modulation of the heat output to tend to maintain said air flow at a substantially constant temperature regardless of the heat output.

3. An electric heating system comprising a bank of heating units, a control unit for exerting an automatic modulating heat control through circuit connections with said units, a thermo-responsive element for actuating said step controller in response to heat demands, a fan operable by said step controller to produce an air flow over said bank of units, and a damper operated by said step controller to modulate said air flow in accordance with the modulating control of said heat.

4. A heating system comprising a bank of heating units, a step controller having a gang of switches for connecting distributed heating units in different circuit arrangements in different heating steps to exert a modulating heat control in response to heat demands, a fan for establishing an air flow over said heating units, and additional switches operable by said step controller to vary the speed of said fan in accordance with the heat output from said bank to maintain a substantially constant temperature in said air flow.

5. An electric heating system comprising a bank of heating units in a heating chamber, a fan for creating an air flow over said units, a step controller for controlling circuit connections to said heating units to energize different groups of distributed units in different heating steps to modulate the heat output of said bank in accordance with heat demands, means operable by said step controller for operating said fan when any of said heating units are energized, means operable by said step controller for varying said air flow in accordance with the heat output, means responsive to excessive heat in said heating chamber to operate said step controller to switch off all of said units, and means responsive to excessive heat in said heating chamber to operate said fan independently of said step controller.

6. An electric furnace heating system comprising a bank of heating units in a heating chamber, a fan for creating an air flow over said heating units, a step controller for altering circuit connections to said heating units to energize different groups of distributed units in different heating steps to exert a modulating control over the heat output in response to heat demands, a plurality of fan circuits controlled by said step controller to operate said fan at different speeds in accordance with the modulating control of the heat output, a safety switch operable to return said step controller to an end position to de-energize said heating circuits and said fan circuits in response to excessive temperature in said heating chamber, and a second safety switch operable when said step controller is in said end position to independently establish a high speed circuit to said fan in response to excessive temperature in said heating chamber.

7. An electric furnace comprising a bank of heating units, a control unit having a switching element movable at a constant speed between end positions, said switching element operating to de-energize all of said units in one end position, to energize all the units for maximum heat output in the other end position, and to energize said units in different combinations in a series of intermediate heating steps between said end positions, to exert a modulating control over the heat output, means to produce an air flow over said units to heat said air, and means having coordinate movement with said switching element to modulate said air flow in accordance with the heat output of said units.

8. In a heating system having at least six heating units, a two wire power supply, a first group of three units connected in series by interunit connections and connected at one end to one of said supply wires, a connection between the other end of the group and the other supply wire including a first switch, a second group of three units connected in series by interunit connections and having units interposed between units of said first group to distribute the heating effect of each group, said second group having an end connection with one of said supply wires, a connection between the other end of said second group and the other supply wire including a second switch, a connection including a third switch between the interunit connection of first and second units of the first group and one of said supply wires, a connection including a fourth switch between the interunit connection of first and second units of the second group and one of said supply wires, connections including additional individual switches between the interunit connections of the second and third units of each group and said supply wires, and a common operating member movable in one direction to close said switches in the order named and movable in the opposite direction to open said switches in reverse order, all the units being de-energized when all the switches are open.

9. In a heating system, power supply wires, a first group of heating units connected in series by interunit connections, end connections for said group with said supply wires, one of said end connections including a switch to energize the units of the group in series when the switch is closed, a connection including a switch between one of said interunit connections and one of said supply wires shunting certain units when the switch is closed, a connection including a switch between an interunit connection of said shunted units and one of said supply wires to re-energize said shunted units when the switch is closed, a second group of heating units connected in series by interunit connections and having units interposed between units of said first group to distribute the heating effect of each group, end connections for said second group with said supply wires, one of said end connections including a switch to energize the units of the second group in series when the switch is closed, a connection including a switch between one of said interunit connections of the second group and one of said supply wires shunting certain units of the second group when the switch is closed, a connection including a switch between an interunit connection of said shunted units and one of said supply wires to re-energize said shunted units when said switch is closed, and a common operating member movable in one direction to close said switches in a predetermined sequence without opening any switches and arranged to close first one of said group end connection switches and then the second group end connection switch, and thereafter closing said shunting and re-energizing switches to produce an increased heating step with each successive switch closure, said operating member being movable in the opposite direction to open said switches in reverse sequence without closing any switches to produce a decreased heating step with each successive switch opening, all of the units being de-energized when all the switches are open.

10. An electric heating system comprising a bank of heating units, the individual units of said bank being arranged in closely adjacent side by side relation for mutual heat exchange therebetween, groups of said units being series connected within each group by interunit connections, units of each group being interposed between the units of at least one other group to distribute the heating effect of each group, power supply wires for the bank, an end connection for each group with one of said supply wires, individual connections including switches between the other ends of the groups and a supply wire to energize said series groups when said switches are closed, a connection including a switch between one of said interunit connections in each group and one of said power wires shunting out all but one unit in each group when the switch is closed whereby one unit is substituted for each group of units when all the group end switches and shunting switches are closed, a connection including a switch between an interunit connection of shunted units in each group and one of said power wires to re-energize the shunted units of the group when the switch is closed, all of said units being energized when all the switches are closed and all of said units being de-energized when all the switches are open, and a common operating member movable in one direction to close said switches in predetermined sequence without opening any switches and arranged to close first said group end connection switches in sequence and thereafter said shunting and re-energizing switches to produce an increased heating step with each successive switch closure, said operating member being movable in the opposite direction to open said switches in reverse sequence without closing any switches to produce a decreased heating step with each successive switch opening.

11. An electric heating system comprising a bank of heating units, the units of said bank being arranged in closely adjacent side by side relation for mutual heat exchange, groups of said units being series connected within each group by interunit connections, units of each group being interposed between units of at least one other group to distribute the heating effect of each group, end connections to power supply wires, including switches, for each group to energize said series groups in a plurality of steps, shunting connections, including switches, between certain of said interunit connections in each group and power supply wires to substitute one unit for each group of units in a plurality of steps, re-energizing connections, including switches, between other of said interunit connections in each group and power supply wires to re-energize said shunted units in a plurality of steps, and a constant speed motor driven operating member movable in a limited range of movement in one direction to close said switches in sequence without opening any switches and movable in the opposite direction to open said switches in reverse sequence without closing any switches.

RILEY H. TAYLOR.

REFERENCES CITED

The following references are of record in the file of this patent:

UNITED STATES PATENTS

| Number | Name | Date |
|---|---|---|
| Re. 18,240 | Brown | Nov. 3, 1931 |
| 568,450 | Meeks | Sept. 29, 1896 |
| 608,211 | McElroy | Aug. 2, 1898 |
| 1,129,842 | Blatchford | Mar. 2, 1915 |
| 1,277,621 | Macklind | Sept. 3, 1918 |
| 1,346,793 | Bunnell et al. | July 13, 1920 |
| 1,669,582 | Staege | May 15, 1928 |
| 2,230,260 | Owen et al. | Feb. 4, 1941 |

FOREIGN PATENTS

| Number | Country | Date |
|---|---|---|
| 346,825 | Great Britain | Apr. 16, 1931 |
| 455,929 | Great Britain | Oct. 30, 1936 |
| 598,604 | France | Oct. 2, 1925 |
| 792,066 | France | Oct. 14, 1935 |